United States Patent
Lee et al.

(10) Patent No.: US 9,507,625 B2
(45) Date of Patent: Nov. 29, 2016

(54) APPARATUS AND METHOD FOR GENERATING SOFTWARE DEFINED NETWORK(SDN)-BASED VIRTUAL NETWORK ACCORDING TO USER DEMAND

(71) Applicant: ELECTRONICS AND TELECOMMUNICATIONS RESEARCH INSTITUTE, Daejeon (KR)

(72) Inventors: Byung Yun Lee, Daejeon (KR); Yong Yoon Shin, Daejeon (KR); Ji Young Kwak, Gwangju (KR); Sae Hoon Kang, Daejeon (KR); Sun Hee Yang, Daejeon (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 0 days.

(21) Appl. No.: 14/800,754

(22) Filed: Jul. 16, 2015

(65) Prior Publication Data

US 2016/0019086 A1   Jan. 21, 2016

(30) Foreign Application Priority Data

Jul. 21, 2014 (KR) ........................ 10-2014-0092127

(51) Int. Cl.
*G06F 9/455* (2006.01)

(52) U.S. Cl.
CPC . *G06F 9/45558* (2013.01); *G06F 2009/45595* (2013.01)

(58) Field of Classification Search
None
See application file for complete search history.

(56) References Cited

U.S. PATENT DOCUMENTS

| 2010/0146109 | A1 | 6/2010 | Yoon |
| 2010/0162259 | A1 | 6/2010 | Koh et al. |
| 2011/0099267 | A1 | 4/2011 | Suri et al. |
| 2012/0131579 | A1* | 5/2012 | Pujolle ............... H04L 12/4641 718/1 |

FOREIGN PATENT DOCUMENTS

KR   10-1212645 B1   12/2012

* cited by examiner

*Primary Examiner* — Gregory A Kessler
(74) *Attorney, Agent, or Firm* — LRK Patent Law Firm (57) ABSTRACT

An apparatus and method for generating a Software Defined Network (SDN)-based virtual network. The apparatus includes a network information generator and a virtual network generator, in which an SDN-based virtual network desired by a user may be generated efficiently by allocating physical resources to reflect various user demands.

8 Claims, 7 Drawing Sheets

| IDENTIFIER INFORMATION | AREA INFORMATION | TYPE OF SWITCH | COST | DISTANCE | LATENCY | RELIABILITY |
|---|---|---|---|---|---|---|
| SW11 | A | ACCESS | 60 | 0 | 0 | 60 |
| SW12 | A | BACKBONE | 80 | 1 | 1 | 85 |
| SW21 | B | ACCESS | 30 | 10 | 10 | 55 |
| SW22 | B | BACKBONE | 90 | 15 | 15 | 90 |
| SW31 | C | ACCESS | 40 | 20 | 20 | 75 |
| SW32 | C | BACKBONE | 70 | 25 | 25 | 85 |
| SW41 | D | ACCESS | 45 | 30 | 30 | 65 |
| SW42 | D | BACKBONE | 95 | 35 | 35 | 80 |

APPARATUS AND METHOD FOR GENERATING SOFTWARE DEFINED NETWORK(SDN)-BASED VIRTUAL NETWORK ACCORDING TO USER DEMAND

CROSS-REFERENCE TO RELATED APPLICATION(S)

This application claims priority from Korean Patent Application No. 10-2014-0092127, filed on Jul. 21, 2014, in the Korean Intellectual Property Office, the entire disclosures of which are incorporated herein by references for all purposes.

BACKGROUND

1. Field

The following description generally relates to an apparatus and method for generating a virtual network in a Software Defined Network (SDN)-based network, and more particularly to an apparatus and method for generating a virtual network efficiently by allocating physical resources of communication equipment included in the network.

2. Description of the Related Art

Recently, networks are increasingly generated by using SDN technology. The SDN technology may virtualize communication equipment included in a network, i.e., hardware by allocating physical resources and by using operation capability of software.

As a network virtualization method, an overlay method is most widely used to generate a virtual network container which is a logical (virtual) segment of the shared (common) physical network resource.

The overlay method includes Generic Routing Encapsulation (GRE), in which one packet (or frame) is encapsulated in another packet or frame, and the resulting packet is delivered to a tunnel end point where a capsule is removed, so that an original packet may be delivered to a destination.

However, in the GRE method, a network is generated by a fixed algorithm that is initially determined, and thus it is difficult to efficiently generate a virtual network desired by a user by reflecting user demands promptly and flexibly and by using various types of information on physical network resources.

SUMMARY

Provided is an apparatus and method for efficiently generating a virtual network according to user demands by collecting various characteristic information that includes physical resources of communication equipment in a network, and by allocating the physical resources to generate a virtual machine (VM) that may reflect user demands by using the collected information.

In one general aspect, there is provided an apparatus for generating a Software Defined Network (SDN)-based virtual network by reflecting user demands, the apparatus including: a network information generator configured to collect characteristic information on communication equipment connected to a network and to generate information required to determine a network path, and a virtual network generator configured to determine a specific path of the network based on the generated information and by reflecting the user demands, to allocate physical resources to generate a virtual switch required for the determined specific path, and to generate a network by generating the virtual switch using the allocated physical resources.

The network information generator may include: a characteristic information collector configured to collect, from the communication equipment in the network, characteristic information that includes the physical resources available to the communication equipment; and a data table generator configured to process the collected characteristic information to generate a data table having types of the processed characteristic information that are categorized into items.

The characteristic information collector may collect characteristic information that includes at least one of physical resource information, identifier information, area information, the types of switches, cost, distance, latency, and reliability.

The virtual network generator may include: a user demand processor configured to select at least one item from among the items included in the data table, so as to use the item as a criterion for determining the specific path according to predetermined user requirements or demands received from a user; a resource allocation calculator configured to determine the specific path according to a predetermined algorithm, so as to reflect the item selected by the user demand processor in determining the specific path, and to allocate physical resources to generate a virtual switch that is necessary for the specific path; and a network generation controller configured to receive information on the specific path determined by the resource allocation calculator and information on the physical resources allocated to generate the switch required for the specific path, and to control network generation by virtualizing each switch by using the allocated physical resources, so as to transmit and receive packets based on the received information.

The resource allocation calculator may determine the specific path that includes access switches and backbone switches in a plurality of areas so as to reflect the demands selected by the user demand processor based on the received information included in the data table generated by the network information generator, and uses an algorithm for allocating the physical resources to virtually generate the access switches and the backbone switches included in the determined specific path.

In another general aspect, there is provided a method of generating a Software Defined Network (SDN)-based virtual network by allocating physical resources, the method including: collecting characteristic information on communication equipment included in a network and generating information required to determine a network path; and determining a specific path of the network based on the generated information and by reflecting user demands, allocating physical resources to generate a virtual switch required for the determined specific path, and generating a network by generating the virtual switch using the allocated physical resources.

The generating of the required information may include: collecting, from the communication equipment in the network, characteristic information that includes the physical resources available to the communication equipment; and processing the collected characteristic information to generate a data table having types of the processed characteristic information that are categorized into items.

The generating of the virtual switch may include: selecting at least one item from among the items included in the data table, so as to use the item as a criterion for determining the specific path according to predetermined user requirements or demands received from a user; determining the specific path according to a predetermined algorithm, so as to reflect the item selected by the user demand processor in determining the specific path, and allocating physical resources to generate a virtual switch that is necessary for the specific path; and receiving information on the determined specific path and information on the physical resources allocated to generate the switch required for the specific path, and controlling network generation by virtualizing each switch by using the allocated physical resources, so as to transmit and receive packets based on the received information.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the apparatus and method for generating an SDN-based virtual network according to user demands will be described with reference to the following drawings.

Figure 1:
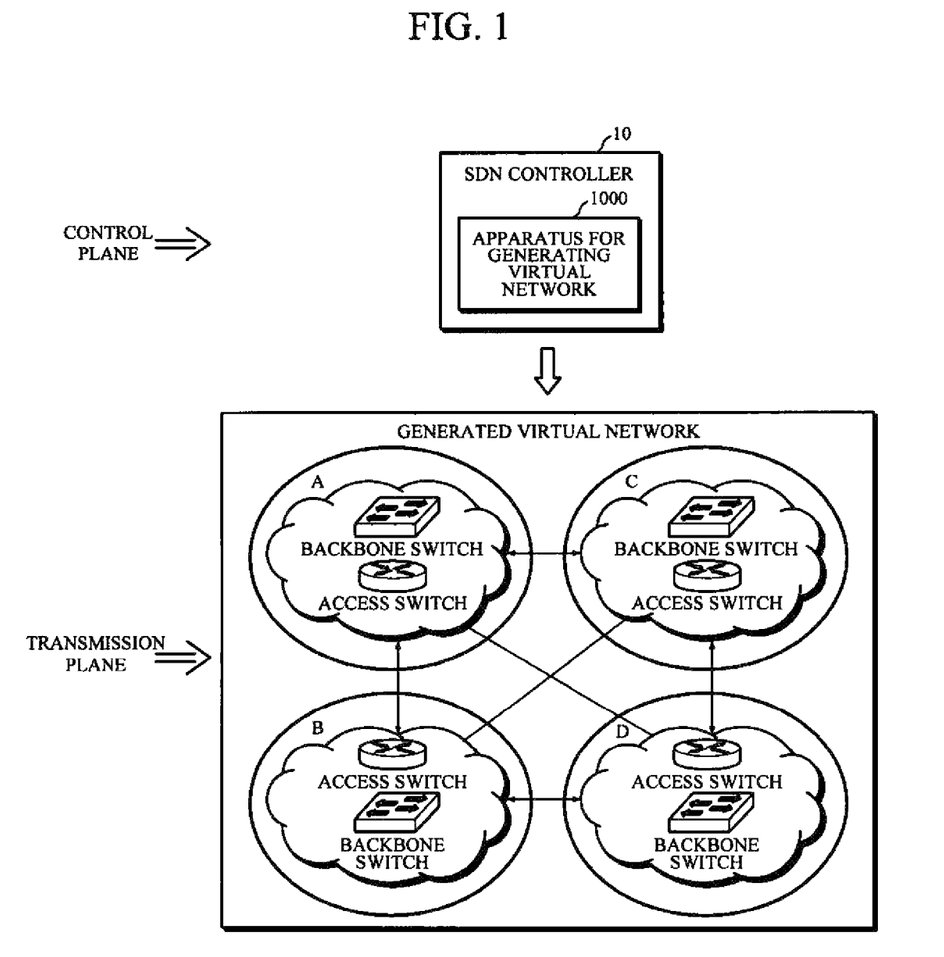
FIG. 1 is a block diagram illustrating an example of an apparatus for generating a virtual network in an SDN environment by reflecting user demands according to an exemplary embodiment.

FIG. 1 is a block diagram illustrating an example of an apparatus for generating a virtual network in an SDN environment by reflecting user demands according to an exemplary embodiment.

Referring to FIG. 1, the apparatus 1000 for generating a virtual network in an SDN environment by allocating physical resources may be included in an SDN controller 10.

In an SDN environment where the control plane and the data plane are separated, the SDN controller 10 may process the control plane by generating all the networks in a centralized manner and controlling packet delivery.

The SDN environment refers to an environment where networks are connected in such a manner that a software-based controller controls and manages network traffic transmission through an open API such as OpenFlow.

In the OpenFlow environment, a control plane that performs traffic transmission and a transmission plane that designates traffic paths are separated such that various physical and virtual resources may be positioned in the transmission plane, and the control plane may monitor and control the transmission plane systematically.

In the SDN environment, data may be transmitted and received in the transmission plane by allocating physical resources of communication equipment included in each network and by generating a virtual switch by using the allocated physical resources.

The generated virtual switch 20 may be an SDN switch.

Referring to FIG. 1, a plurality of virtual switches may be formed by allocating physical resources in a network so that a virtual network may be generated to enable data to be transmitted and received in the transmission plane that is divided into areas.

FIG. 1 illustrates a transmission plane that is divided into four areas A, B, C, and D, but the transmission plane is not limited thereto and may be divided into a various number of areas depending on geographical locations of virtual switches for packet transmission.

The virtual switch may be an SDN switch, and each area may have at least one access switch and one backbone switch.

The SDN switch will be described in further detail with reference to FIG. 2, and a method of generating a virtual network will be described in further detail with reference to FIG. 6.

Figure 2:
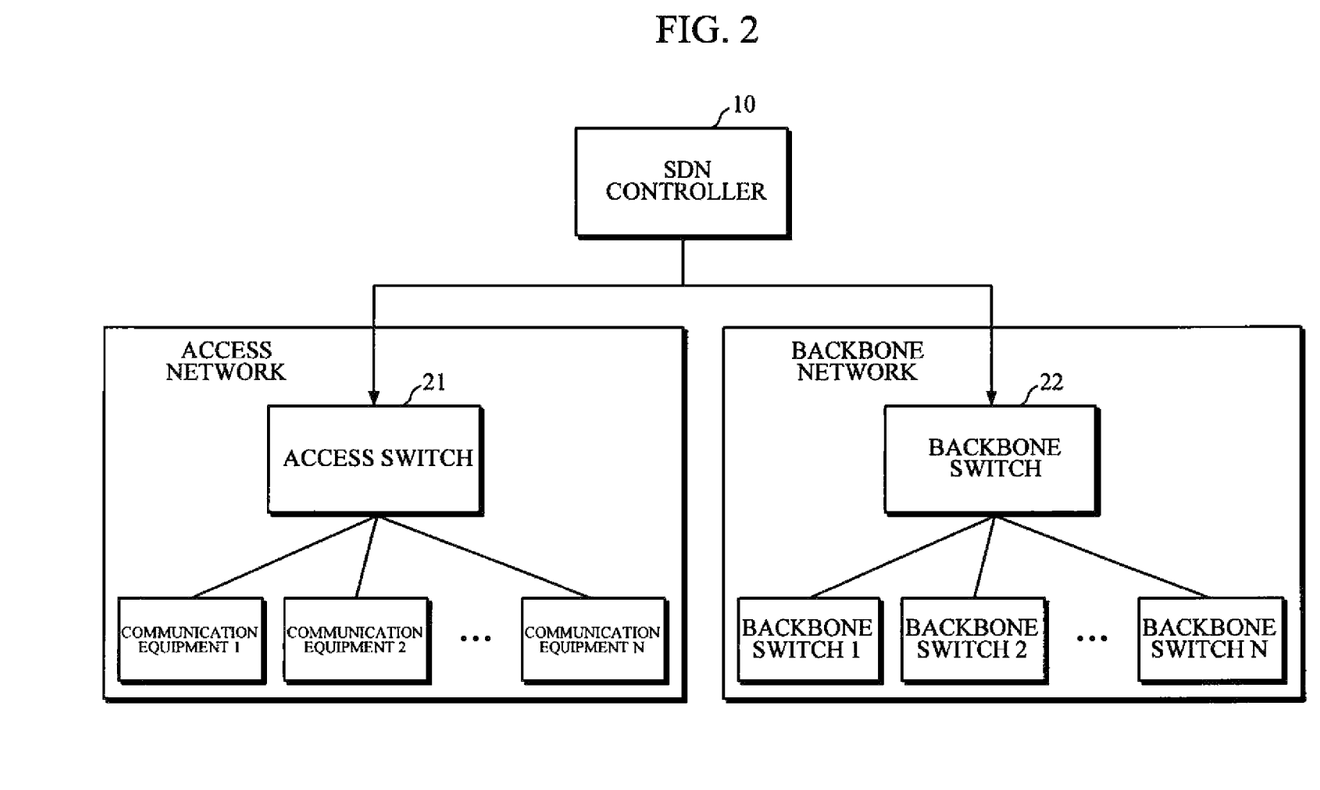
FIG. 2 is a block diagram illustrating an access switch and a backbone switch in an SDN environment of each area according to an exemplary embodiment.

FIG. 2 is a block diagram illustrating an access switch 21 and a backbone switch 22 in an SDN environment of each area according to an exemplary embodiment.

Referring to FIG. 2, the SDN switch may include an access switch and a backbone switch, which may generate an access network and a backbone network, respectively.

The access switch 21 may refer to a switching device that has a single step of data exchange, and an access network may refer to a network generated by connection to at least one piece of communication equipment through the access switch 21.

Data may be exchanged between a pair of access switches and all terminals, such as transmission lines, relay lines, and service lines, or between synchronous Data Terminal Equipment (DTE) and a Packet Assembly and Disassembly (PAD) apparatus by a method of user data exchange.

The backbone switch 22 is a switch that may generate a network by contacting each layer switch to a data center switch and by contacting a workgroup switch to a backbone switch, and a backbone network may be a network that is generated by connection to at least one piece of communication equipment through the backbone switch 22.

Figure 3:
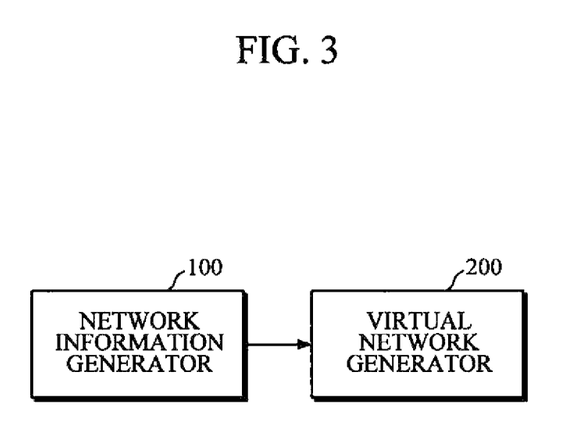
FIG. 3 is a block diagram illustrating an example of an apparatus for generating an SDN-based virtual network by reflecting user demands according to an exemplary embodiment.

FIG. 3 is a block diagram illustrating an example of an apparatus 1000 for generating an SDN-based virtual network by reflecting user demands according to an exemplary embodiment.

Referring to FIG. 3, the apparatus 1000 for generating an SDN-based virtual network according to user demands includes a network information generator 100 and a virtual network generator 200.

The network information generator 100 may collect characteristic information on communication equipment included in a network to generate necessary information for selecting a network path.

The types of data to be collected and a data table to be generated will be described in further detail with reference to FIG. 5.

The virtual network generator 200 may generate a network by selecting a specific network path by reflecting user demands based on the information generated by the network information generator 100; by allocating physical resources to generate a virtual switch that is required for the selected specific path; and by generating a virtual switch by using the allocated physical resources.

The allocation of physical resources or the generation of a virtual network will be described in further detail with reference to FIG. 6.

Figure 4:
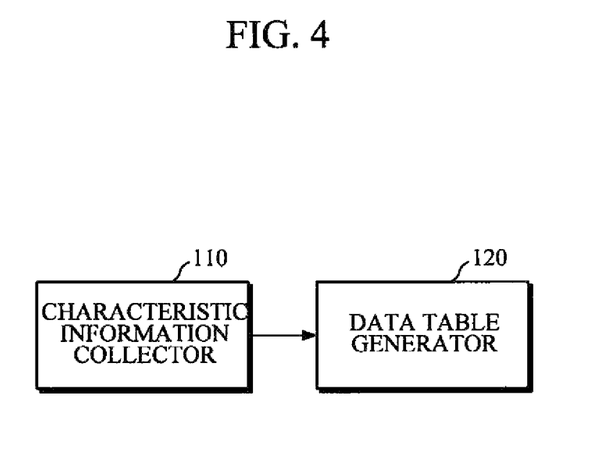
FIG. 4 is a detailed diagram illustrating a network information generator illustrated in FIG. 2.

FIG. 4 is a detailed diagram illustrating the network information generator 100 illustrated in FIG. 2.

Referring to FIG. 4, the network information generator 100 includes a characteristic information collector 110 and a data table generator 120.

The characteristic information collector 110 may collect, from communication equipment included in a network, characteristic information that includes information on physical resources available to the communication equipment.

The characteristic information may include information on an identifier of a physical switch to be virtualized, an area, the types of switches, latency, reliability, and the like.

Each information will be described in further detail with reference to FIG. 5.

The data table generator 120 may process characteristic information collected by the characteristic information collector 110 to generate a data table in which the types of processed characteristic information are categorized into items.

In the data table, the types of information included in the characteristic information collected by the characteristic information collector 110 are arranged as items in a row, and information on identifiers of physical switches to be virtualized is arranged as items in a column.

Figure 5:
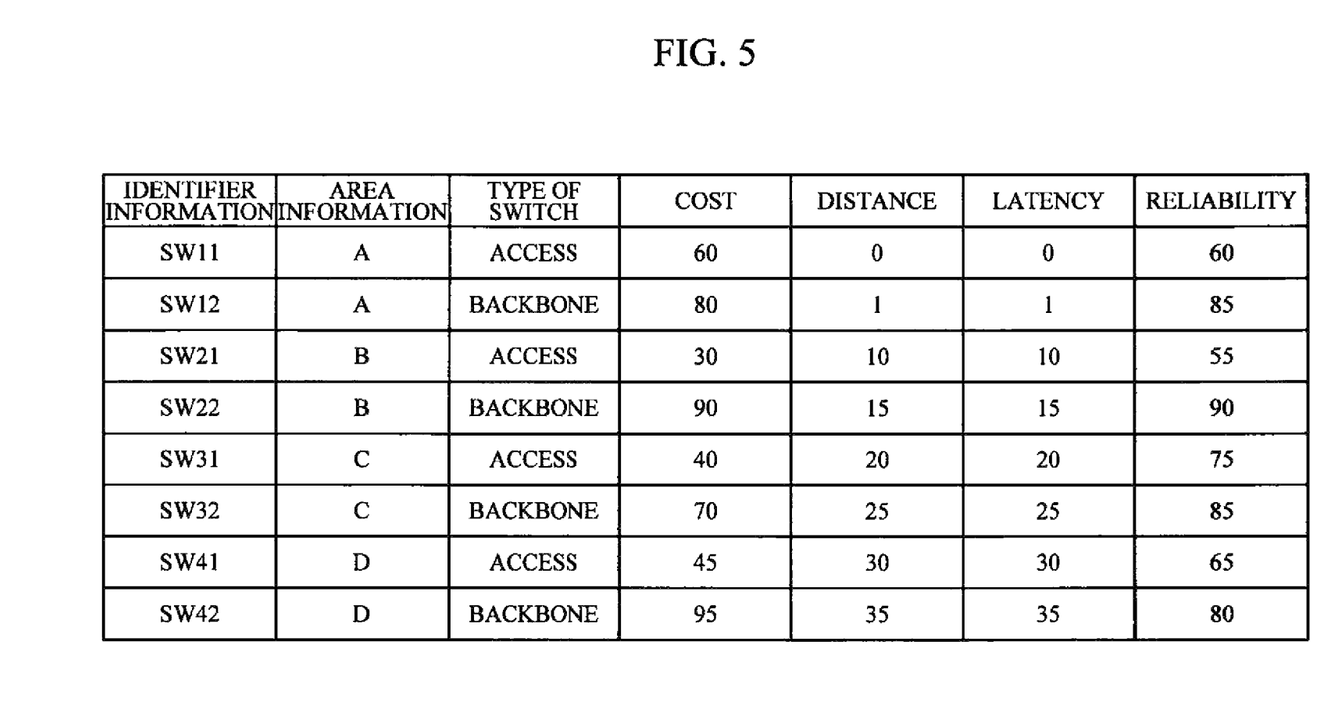
FIG. 5 is a diagram illustrating a data table generated by a data table generator illustrated in FIG. 4.

The data table generated as in the exemplary embodiment is illustrated in FIG. 5.

The data table may be generated as described above, but is not limited thereto, and any data table may be used as long as the data table may include network characteristic information.

FIG. 5 is a diagram illustrating a data table generated by a data table generator illustrated in FIG. 4.

Referring to FIG. 5, the data table includes information on identifiers arranged as items in a column, and area information, the types of switches, cost, distance latency, and reliability arranged as items in a row.

The area information, the types of switches, cost, distance, latency, and reliability may be included in one data table, but a data table may be generated separately for each item, and connection may be made so that a previously generated data table may refer to separate data tables to import information from the separate data tables.

The information on identifiers refers to information used to identify physical switches to be virtualized. In the exemplary embodiment, the areas and types of switches may be identified in such a manner that a physical switch located in area A is indicated as SW1, and a physical switch located in area B is indicated as SW2, area C as SW 3, and area D as SW 4 in alphabetical order. If a switch is an access switch, for example, in area A, "1" is put after SW1 to, indicate the switch as SW11, and if a switch is a backbone switch in area A, "2" is put after SW1 to indicate the switch as SW12.

Area information refers to information on areas where physical switches to be virtualized are located.

Information on the types of switches refer to information on whether a physical switch to be virtualized is an access switch or a backbone switch.

The cost refers to expenses that are required to provide services using communication equipment in a network that provides physical resources, and the cost is represented as percentage values and may vary depending on the unit price of devices.

The distance refers to a distance between communication equipment and adjacent communication equipment in a network that provides physical resources.

The latency refers to time taken to transmit data to communication equipment and adjacent communication equipment in a network that provides physical resources.

The reliability refers to reliability of devices in a network that provides physical resources, and the reliability is represented as percentage values. The reliability may indicate availability or stability of a device when virtualization is performed using the device in a network that provides physical resources.

Figure 6:
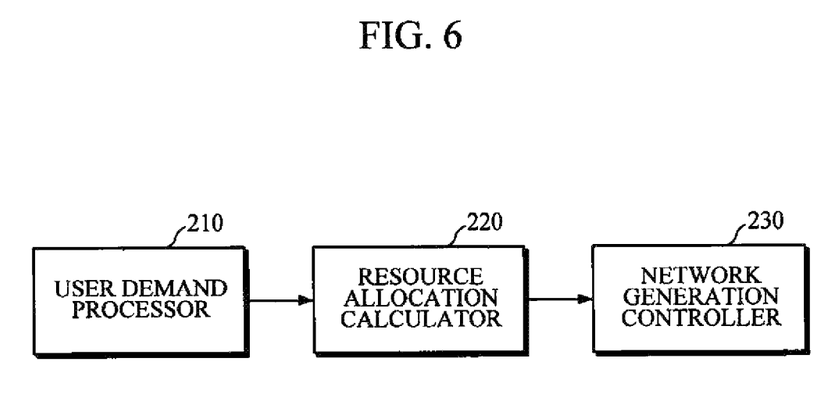
FIG. 6 is a detailed diagram illustrating a virtual network generator illustrated in FIG. 2.

FIG. 6 is a detailed diagram illustrating a virtual network generator 200 illustrated in FIG. 2.

Referring to FIG. 6, the virtual network generator 200 includes a user demand processor 210, a resource allocation calculator 220, and a network generation controller 230.

The user demand processor 210 may select at least one item from among the items included in the data table, so as to use the item as a criterion for determining a specific path according to predetermined user requirements or demands received from a user.

The demands used to determine the specific path may be predetermined by, a user or may be directly input by a user in real time to change the configuration of a network.

In the case where demands are directly input by a user in real time, a user terminal may be used, to input information, but the input is not limited thereto.

The resource allocation calculator 220 may determine the specific path according to a predetermined algorithm so that the item selected by the user demand processor 210 may be used to determine the specific path, and may allocate physical resources to generate a virtual switch that is necessary for the specific path.

The predetermined algorithm may include a calculation method for allocating physical resources of communication equipment in a network to reflect predetermined demands.

In the exemplary embodiment, the network generation controller 230 may receive information included in the data table generated by the network information generator 100; may determine, based on the information, a specific path that includes access switches and backbone switches in a plurality of areas to reflect demands selected by the user demand processor 210; and may use an algorithm to allocate physical resources so that the access switches and the backbone switches included in the determined specific path may be virtualized.

A method of determining the most appropriate pair of access and/or backbone switches may vary depending on the items of the data table.

For example, by referring to the data table illustrated in FIG. 5, if a user demand relates to changing a geographical location (A→D), a network may be generated by referring to a distance item in the data table, in which a pair of access and backbone switches for each area may be determined so that a geographical location of physical devices may be connected to switches located in area D.

Further, by referring to the data table illustrated in FIG. 5, if a user demand relates to costs (A→D), a virtual network that passes a specific path (A→D) may be generated, in which physical resources are allocated to generate a path that requires a minimum cost by calculating the unit price of services provided by communication equipment included in the path with respect to switches in each area.

By referring to the data table illustrated in FIG. 5, if a user demand relates to high reliability (A→D), a virtual network that passes a specific path (A→D) may be generated, in which physical resources are allocated by calculating stability of services of communication equipment included in the path with respect to switches in each area, and by giving high scores to a switch having high stability considering that higher stability results in higher reliability, and by calculating reliability of communication equipment, so that a network may be generated through a path of the highest reliability.

By referring to the data table illustrated in FIG. 5, if a user demand relates to latency (A→D), a virtual network may be generated by referring to a table (FIG. 6) of a latency field with respect to switches located in start information A, in which physical resources are allocated to generate a network by calculating latency of communication equipment and by determining a path that satisfies latency desired by a user.

Physical resources may be allocated by distributing physical resources to virtualize access or backbone switches in areas that the determined specific path passes.

The network generation controller 230 may receive information on the specific path determined by the resource allocation calculator 220 and information on physical resources allocated to generate a switch required for the specific path, and may control network generation by virtualizing each switch by using the allocated physical resources so that packets may be transmitted and received based on the received information.

A method of generating a virtual switch based on SDN according to the exemplary embodiment may include: generating a virtual machine (VM) that may serve as an access or backbone switch by using allocated physical resources; and using the generated VM as a virtual switch.

Figure 7:
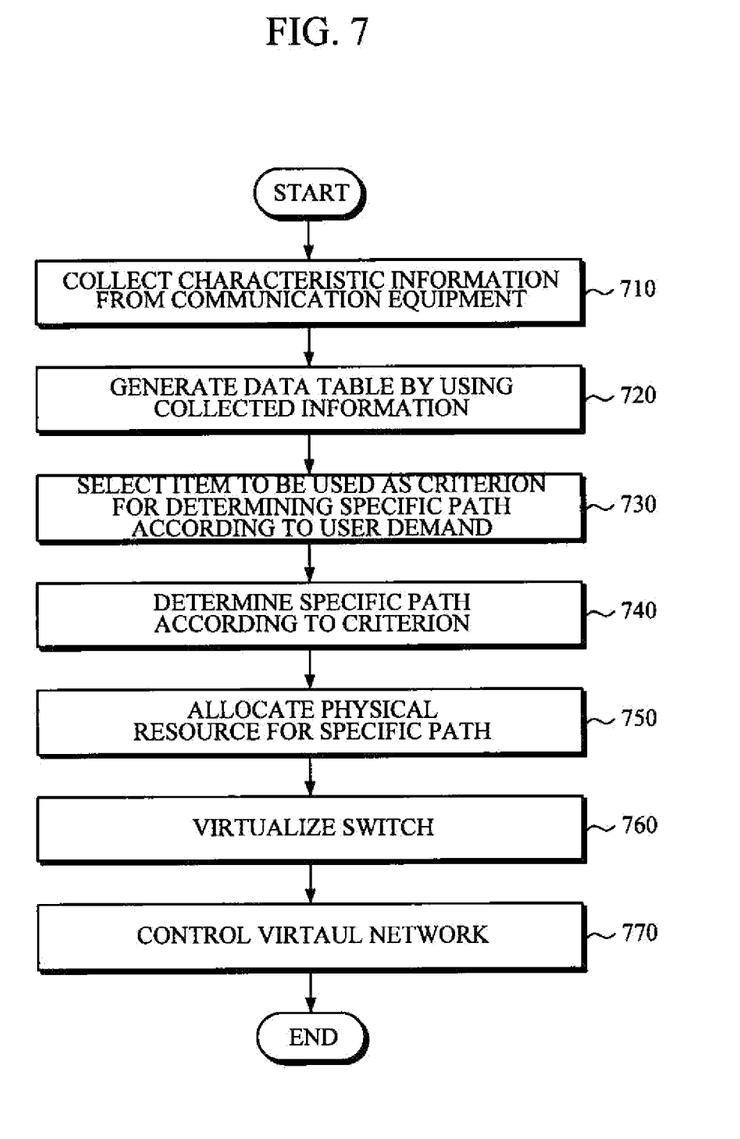
FIG. 7 is a flowchart illustrating a method of generating an SDN-based virtual network by reflecting user demands according to an exemplary embodiment.

FIG. 7 is a flowchart illustrating a method of generating an SDN-based virtual network by reflecting user demands according to an exemplary embodiment.

Characteristic information that includes information on physical resources is collected from communication equipment in a network in 710.

The characteristic information may include information on an identifier of a physical switch to be virtualized, area information, the types of switches, latency, reliability, and the like.

A data table is generated in 720 including the collected characteristic information categorized into items.

The data table may include the types of information included in the collected characteristic information arranged as items in a row and information on identifiers of physical switches to be virtualized arranged as items in a column.

The data table may be generated as described above, but is not limited thereto, and any data table may be used as long as the data table may include network characteristic information.

At least one item is selected in 730 from among the items included in the data table, so as to be used as a criterion for determining a specific path according to predetermined user requirements or demands received from a user.

The demands used to determine the specific path may be predetermined by a user or may be directly input by a user in real time to change the configuration of a network.

In the case where demands are directly input by a user in real time, a user terminal may be used to input information, but the input is not limited thereto.

The specific path is determined in 740 according to a predetermined algorithm to reflect the selected item in determining the specific path.

The predetermined algorithm may include a calculation method for allocating physical resources of communication equipment in a network to reflect the predetermined demand.

In the exemplary embodiment, information included in the generated data table is received; based on the information, a specific path that includes access switches and backbone switches in a plurality of areas is determined to reflect demands selected by the user demand processor 210; and an algorithm for allocating physical resources may be used so that the access switches and backbone switches included in the determined specific path may be virtualized.

A method of determining the most appropriate pair of access and/or backbone switches may vary depending on the items of the data table.

Physical resources are, allocated in 750 to generate a virtual switch required for the specific path.

Physical resources may be allocated by distributing physical resources to virtualize access or backbone switches in areas that the determined specific path passes.

Information on the determined specific path and information on physical resources allocated to generate switches required for the specific path are received; and each switch is virtualized using the allocated physical resources so that packets may be transmitted and received based on the received information in 760.

A method of generating a virtual switch based on SDN according to the exemplary embodiment may include: generating a virtual machine (VM) that may serve as an access or backbone switch by using allocated physical resources; and using the generated VM as a virtual switch.

Network generation is controlled by generating virtual switches in 770.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating a Software Defined Network (SDN)-based virtual network by reflecting user demands, the apparatus comprising:
one or more generators, a collector, and a calculator being configured and executed by a hardware processor using algorithms associated with at least one non-transitory storage device, the algorithms, when executed, causing the hardware processor to execute the generators, collector, and calculator, the one or more generators comprising,
a network information generator configured to collect characteristic information on communication equipment connected to a network and to generate information required to determine a network path; and in response to receipt of user demands relating to at least one of changing a geographical location, calculating a unit price of a service, calculating stability of services, and calculating latency of services of the communication equipment, a virtual network generator configured to determine a physical path of the network based on the generated information, and to allocate physical resources by generating a virtual switch which is capable of determining the physical path, wherein access switches and backbone switches included in the determined physical path are virtually controlled using the virtual switch.

2. The apparatus of claim 1, wherein the network information generator comprises:

a characteristic information collector configured to collect, from the communication equipment in the network, characteristic information that includes the physical resources available to the communication equipment; and a data table generator configured to process the collected characteristic information to generate a data table having types of the processed characteristic information that are categorized into items.

3. The apparatus of claim 2, wherein the characteristic information collector collects characteristic information that includes at least one of physical resource information, identifier information, area information, the types of switches, cost, distance, latency, and reliability.

4. The apparatus of claim 1, wherein the virtual network generator comprises:

a user demand processor configured to select at least one item from among the items included in the data table, so as to use the item as a criterion for determining the physical path according to predetermined user requirements or the user demands;

a resource allocation calculator configured to determine the physical path according to a predetermined algorithm, so as to reflect the item selected by the user demand processor in determining the physical path, and to allocate physical resources to generate a virtual switch that is necessary for the physical path; and a network generation controller configured to receive information on the physical path determined by the resource allocation calculator and information on the physical resources allocated to generate the virtual switch required for the physical path, and to control network generation by virtualizing each switch by using the allocated physical resources, so as to transmit and receive packets based on the received information.

5. The apparatus of claim 4, wherein the resource allocation calculator determines the physical path that includes access switches and backbone switches in a plurality of areas so as to reflect the demands selected by the user demand processor based on the received information included in the data table generated by the network information generator, and uses an algorithm for allocating the physical resources to virtually generate the access switches and the backbone switches included in the determined physical path.

6. A computer-implemented method of generating a Software Defined Network (SDN)-based virtual network by allocating physical resources, the method comprising:

collecting characteristic information on communication equipment included in a network and generating information required to determine a network path; and in response to receipt of user demands relating to at least one of changing a geographical location, calculating a unit price of a service, calculating stability of services, and calculating latency of services of the communication equipment, determining a physical path of the network based on the generated information and allocating physical resources by generating a virtual switch which is capable of determining the physical path, wherein access switches and backbone switches included in the determined physical path are virtually controlled using the virtual switch.

7. The method of claim 6, wherein the generating of the required information comprises:

collecting, from the communication equipment in the network, characteristic information that includes the physical resources available to the communication equipment; and processing the collected characteristic information to generate a data table having types of the processed characteristic information that are categorized into items.

8. The method of claim 6, wherein the generating of the virtual switch comprises:

selecting at least one item from among the items included in the data table, so as to use the item as a criterion for determining the physical path according to predetermined user requirements or demands received from a user;

determining the physical path according to a predetermined algorithm, so as to reflect the item selected by the user demand processor in determining the physical path, and allocating physical resources to generate a virtual switch that is necessary for the physical path; and receiving information on the determined physical path and information on the physical resources allocated to generate the virtual switch required for the physical path, and controlling network generation by virtualizing each switch by using the allocated physical resources, so as to transmit and receive packets based on the received information.

* * * * *